United States Patent Office 3,524,902
Patented Aug. 18, 1970

3,524,902
REACTION PRODUCT OF POLYESTER OF A POLY-OXYALKYLENE ETHER OF A DIHYDRIC PHENOL, AND AN UNSATURATED DICARBOXYLIC ACID WITH AN EPOXY COMPOUND AND AN UNSATURATED MONOMER
Joseph Feltzin and Frank T. Sanderson, Wilmington, Del., assignors to Atlas Chemical Industries, Inc., Wilmington, Del., a corporation of Delaware
No Drawing. Filed June 2, 1967, Ser. No. 643,071
Int. Cl. C08g 45/14
U.S. Cl. 260—835
14 Claims

ABSTRACT OF THE DISCLOSURE

Process of improving the clarity, stability, and uniformity of unsaturated polyester composition-unsaturated monomer solutions by improving the solubility of unsaturated polyester compositions in unsaturated monomers. The process comprises reacting the carboxy salts present in the unsaturated polyester composition with an epoxy compound having a molecular weight from 44 to 1,000. The unsaturated polyester is prepared from equimolar proportions of an unsaturated dicarboxylic acid and a polyoxyalkylene ether of a dihydric phenol.

---

This invention relates to a process of improving the solubility of unsaturated polyester compositions in co-polymerizable, ethylenically unsaturated monomers and to the resulting polyesters.

Unsaturated polyesters prepared by condensing an ethylenically unsaturated dicarboxylic acid or anhydride with a polyoxyalkylene ether of a dihydric phenol under poly-esterification conditions are well known in the prior art. The unsaturated polyesters are copolymerized with an ethylenically unsaturated monomer to form a thermo-setting, substantially infusible, three dimensionally cross-linked copolymer resin. It is customary for manufacturers of unsaturated polyesters to dissolve them in copolymeri-zable, ethylenically unsaturated monomers and market the solutions. In this way, purchasers of these solutions, who are usually manufacturers of plastic components, need only heat and/or catalyze the solutions to make them ready for ultimate use.

Unsaturated polyesters of ethylenically unsaturated di-carboxylic acids or anhydrides and polyoxalkylene ethers of dihydric phenols have, however, a number of disad-vantages. Copolymerizable, ethylenically unsaturated monomer solutions of these unsaturated polyesters are hazy and turbid; and, on storage, the materials causing this haziness and turbidity precipitate from solution. Since the precipitation takes place at varying rates, the compo-sition of the solution is not uniform; and, accordingly, it is impossible to prepare uniform resins from such solu-tions. Furthermore, the polyester solutions are often stored in tanks which have drains in the lower sections thereof, and the solids precipitating from solution obstruct the drains and drain lines. In addition, the supernatant liquids often copolymerize in the storage tanks.

It has now been found, in accordance with this inven-tion, that the foregoing problems are caused by inorganic salts of carboxy-terminated polyesters, inorganic salts of carboxy-terminated monoesters, and inorganic salts of unreacted carboxylic acids which are present in the un-saturated polyesters. These salts are formed during the preparation of the unsaturated polyesters by the reaction of free carboxyl groups with inorganic, salt-forming im-purities present in the polyoxyalkylene ethers of dihydric phenols used to prepare the polyesters. These inorganic, salt-forming materials are remnants of the reaction used to prepare the polyoxyalkylene ethers of dihydric phenols.

Polyoxyalkylene ethers of dihydric phenols are pre-pared by reacting an alkylene oxide with a dihydric phenol in the presence of an alkali metal catalyst. After the alkoxylation reaction is completed, the catalyst is neu-tralized with acid to form a salt. All of this salt cannot be removed from the alkoxylation product, and is carried into the polyesterification vessel, where some alkali metal carboxylates are formed. The metal carboxylates are in-soluble in ethylenically unsaturated monomers.

It has now been found, in accordance with this inven-tion, that the solubility of a carboxy salt containing poly-ester composition in an ethylenically unsaturated mono-mer, said polyester composition being predominantly the product of esterification reaction between an ethylenically unsaturated dicarboxylic acid and a polyoxyalkylene ether of a dihydric phenol, can be improved by reacting the carboxy salts present in the polyester composition with an epoxy compound, thereby converting the metal car-boxylates to the more soluble metal alcoholates. The resulting epoxy-modified polyester composition can be readily dissolved in an ethylenically unsaturated mono-mer to form a clear, stable, uniform solution.

Epoxy compounds which may be used in accordance with this invention are mono and polyepoxy compounds having a molecular weight ranging from 44 to 1000. The expression "epoxy compounds" is used herein to include only those compounds containing at least one

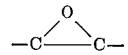

group, that is vicinal epoxy compounds. The epoxy com-pounds may be saturated or unsaturated, straight chain or branched chain, aliphatic, cycloaliphatic, aromatic, or heterocyclic. Mixtures of epoxy compounds may also be used. Among the numerous epoxy compounds which are suitable for use in accordance with this invention are vinyl cyclohexene dioxide, diglycidyl ether of 2,2-di(4-hydroxy phenyl) propane, phenyl glycidyl ether, 1,2-epoxy eicosane, cyclooctane epoxide, 1,2-epoxy octane, epichloro-hydrin, ethylene oxide, butylene oxide, styrene oxide, cyclohexene oxide and 3,4-hexylethylene oxide.

The reaction of an epoxy compound with the metal carboxylates present in the polyester composition may be carried out by heating a mixture of the epoxy com-pound and the polyester composition until substantial-ly all the metal carboxylates present in the polyester com-position are converted to metal alcoholates. The re-action temperature and reaction time will vary depend-ing upon the particular polyester and epoxy compound employed. In general, temperatures from about 125° C. to about 250°C. and a reaction time of from ½ to 10 hours has been found to be satisfactory. The epoxy com-pound may be reacted with the polyester composition after the polyesterification reaction is completed, or the epoxy compound may be added to the polyester re-action mixture after the polyesterification is only 70% complete. The addition of epoxy compound to the poly-ester reaction mixture before the polyesterification re-action is at least 70% complete will result in inferior polyester resins.

The weight ratio of epoxy compound to polyester may also vary widely depending upon the particular poly-ester and epoxy compound employed. In general, a weight ratio of epoxy compound to polyester of 0.005 to 0.1 is satisfactory. A weight ratio of epoxy compound to poly-ester of 0.01 to 0.05 is preferred.

The polyester compositions which may be modified with epoxy compounds according to this invention comprise, at least in part, the reaction product of a polyoxyalkylene ether of a dihydric phenol and an ethylenically unsatu-rated dicarboxylic acid.

Exemplary of the polyoxyalkylene ether of dihydric phenols which may be used to form the polyester compositions of the present invention are polyoxypropylene (2) 2,2-di(4-hydroxyphenyl) propane, polyoxypropylene (20) 2,2-di(4-hydroxyphenyl) propane, polyoxypropylene (3) di(4-hydroxyphenyl) methane, polyoxybutylene (2.5) 2,2-di(3-methyl-4-hydroxyphenyl) butane, polyoxypropylene (3) 2,2 - di(4-hydroxyphenyl) propane, polyoxypentylene (5) 4,4'-dihydroxybiphenyl, polyoxypropylene (16) 2,2-di(4-hydroxyphenyl) propane, polyoxyethylene (2.2) hydrogenated 2,2' - di(4-hydroxyphenyl) propane, polyoxypropylene (4) 2,4-dihydroxy benzophenone, polyoxyethylene (2) 4,4'-dihydroxydiphenyl ether, polyoxypropylene (2) 4,4'-dihydoxydiphenyl sulfone, polyoxyethylene (2) 4,4'-dihydroxydiphenyl ketone, polyoxypropylene (4) hydroquinone, and polyoxypropylene (2) resorcinol.

A preferred class of polyoxyalkylene ethers of dihydric phenols which may be used to form the polyester compositions of this invention are those represented by the general formula

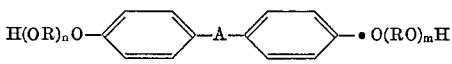

wherein $n$ and $m$ are integers and the sum of $n$ and $m$ is from 2 to 20, A is an alkylene radical having from 1 to 4 carbon atoms, and R is an alkylene radical having from 2 to 4 carbon atoms. Polyoxyalkylene ether diols corresponding to the above formula are disclosed in U.S. Pat. No. 2,331,265, hereby incorporated hereinto by reference.

Typical ethylenically unsaturated dicarboxylic acids and anhydrides which may be used to form the polyester compositions are maleic acid, fumaric acid, and maleic anhydride.

The aforesaid polyester compositions which may be modified with epoxy compounds according to this invention may also be prepared by the reaction of a polyoxyalkylene ether of a dihydric phenol and a mixture of ethylenically unsaturated dicarboxylic acid and saturated dicarboxylic acid, such as adipic acid, phthalic acid, and isophthalic acid, provided only that at least about 50 percent of the dicharboxylic acid moiety of the polyester composition be contributed by an ethylenically unsaturated dicarboxylic acid. In all polyester compositions of this invention the dicarboxylic acid moiety and the polyoxyalkylene ether of a dihydric phenol moiety are present in essentially equimolar amounts.

A more detailed description of the polyesters which may be used in this invention may be found in U.S. Pat. No. 2,634,251 and U.S. Pat. No. 3,214,491, hereby incorporated hereinto by reference.

The epoxy modified polyester compositions of this invention are readily dissolved in copolymerizable, ethylenically unsaturated monomers to form a completely clear, stable uniform solution. Among the numerous copolymerizable monomers which may be used to form the clear, stable solutions of this invention are styrene, vinyl toluene, chlorostyrene, divinylbenzene, diallylphthalate, acrylonitrile, methyl methacrylate, vinyl acetate, ethyl acrylate. The normal concentration of said ethylenically unsaturated monomer is from 0.05 to .95 of the total weight of the polyester solution per U.S. Pat. No. 3,214,491, supra, methylstyrene, vinyl pyridine and 2-ethyl hexyl acrylate.

Conventional reaction initiators of the kind frequently referred to as "free radical catalysts" may be used to initiate the reaction between the epoxy modified polyester composition and copolymerizable, ethylenically unsaturated monomer. Typical of such initiators or "catalysts" are organic peroxy compounds such as methylethyl ketone peroxide, benzoyl peroxide, t-butyl perbenzoate, cumene hydroperoxide, and succinic peroxide.

Accelerators for the reaction between the epoxy modified polyester composition and unsaturated monomer may also be used. Exemplary of such accelerators are dimethyl aniline and cobalt naphthenate.

In order that those skilled in the art may better understand how the present invention may be practiced, the following examples are given. These examples are set forth solely for the purpose of illustration and any specific enumeration of details contained therein should not be interpreted as expressing limitations of this invention. All parts and percentages are by weight, unless otherwise stated.

EXAMPLE 1

A three-liter glass round-bottom flask is fitted with mechanical stirrer, carbon dioxide inlet tube, temperature indicator and distillation head. The flask is charged with 1,566 grams (4.4 moles by hydroxyl number calculation) of polyoxypropylene (2.2) 2,2-di(4-hydroxyphenyl) propane. While the glycol is warmed and stirred, 512 grams (4.4 moles) of fumaric acid are added along with 1.04 grams (0.05 weight percent) of hydroquinone. When addition of these ingredients is completed, carbon dioxide is bubbled into the mass, stirring rate is set at 130 r.p.m., and the reactants are heated to 210° C. These conditions are maintained for 6 hours, at which time the product acid value is 31. External heating is stopped, and 104 grams (5 weight percent) of vinyl cyclohexene dioxide are added over a 10 minute period, at stirring rate of 260 r.p.m. When all dioxide has been added, stirring rate is reset at 130 r.p.m. and heat is reapplied to maintain a reaction temperature of 210° C. These conditions are maintained for ½ hour and then vacuum (about 15 mm. of Hg) is applied. The process is continued for one more hour, and then the product is poured into an aluminum tray and cooled. The resultant polymer is found to have an acid value of 7.6 and a softening point (Ball and Ring—ASTM E–28–58T) of 95° C. Equal parts of this resin and styrene are blended to give a perfectly clear solution. A portion of this solution is charged with 0.75 weight percent benzoyl peroxide and placed in a glass mold. The catalyzed solution is heated to form copolymer by the following schedule:

16–24 hours at 65° C.
1 hour at 90° C.
1 hour at 150° C.

The copolymer removed from the mold has the following properties:

Flexural strength—18,000 p.s.i.
Flexural modulus—$0.46 \times 10^6$
Barcol hardness—39–41
Heat deflection temperature—124° C.

The uncatalyzed solution is still clear at the end of six weeks' storage.

EXAMPLE 2

The quantity of reactants and the process are identical to those shown in Example 1 except that only 1.25 weight percent of vinyl cyclohexene dioxide is used. The reaction product has a final acid value of 17.6 and a softening point of 95° C. Here again, a clear solution resulted from blending equal parts of styrene and epoxy-modified polyester. The copolymer removed from the mold has the following properties:

Flexural strength—18,600 p.s.i.
Flexural modulus—$0.44 \times 10^6$
Barcol hardness—38–40
Heat deflection temperature—126° C.

EXAMPLE 3

The weight of reactants and process are identical to those of Example 1 except that 5 weight percent of diglycidyl ether of 2,2-di(4-hydroxyphenyl) propane is used in place of vinyl cyclohexene dioxide. The final epoxy-modified polyester has an acid value of 15 and a softening point of 99° C. The styrene solution of this product is perfectly clear. The copolymer removed from the mold has the following properties:

Flexural strength—18,600 p.s.i.
Flexural modulus—$0.46 \times 10^6$
Barcol hardness—38–41
Heat deflection temperature—125° C.

EXAMPLE 4

A one-liter glass round-bottom flask is fitted with mechanical stirrer, carbon dioxide inlet tube, temperature indicator, and distillation head. The flask is charged with 392 (1.1 moles by hydroxyl number calculation) of polyoxypropylene (2.2) 2,2 - di(4 - hydroxyphenyl) propane. While the glycol is warmed and stirred, 128 grams (1.1 moles) of fumaric acid are added along with 0.26 gram of hydroquinone. When addition of these ingredients is completed, carbon dioxide is bubbled into the mass, stirring rate is set at 130 r.p.m., and the mixture heated to 210° C. over a 1–2 hour period. These conditions are maintained for five hours, at which time the external heating is stopped and 13 grams (2.5 weight percent) of phenyl glycidyl ether are added over a five minute period while stirring at 130 r.p.m. When all epoxide has been added, heat is reapplied to maintain reaction temperature of 210° C. These conditions are maintained for 2⅓ hours and then vacuum (about 15 mm. of Hg) is applied for 45 minutes at 210° C. The product is poured into an aluminum tray and cooled to give a polyester with an acid value of 12.6 and softening point of 93° C. Equal parts of resin and styrene are blended to give a perfectly clear solution. The solution is catalyzed and reacted at elevated temperatures as described in Example 1 to give a polyester-styrene copolymer with the properties listed as follows:

Flexural strength—16,200 p.s.i.
Flexural modulus—$0.46 \times 10^6$
Barcol hardness—39–41
Heat deflection temperature—126° C.

EXAMPLE 5

The reactants and process are identical to those shown in Example 4, except that 1,2-epoxy eicosane is used in place of phenyl glycidyl ether, and is added at an acid value of about 20. The polyester product has a softening point of 94° C. and a final acid value of 13. The solution derived from equal parts of polyester and styrene is clear, and when copolymerized by the method of Example 1, gives a product with the following properties:

Flexural strength—14,000 p.s.i.
Flexural modulus—$0.48 \times 10^6$
Barcol hardness—35–37
Heat deflection temperature—123° C.

EXAMPLE 6

The reactants and process are identical to those shown in Example 4, except that cyclooctane epoxide is used in place of phenyl glycidyl ether. The polyester has a softening point of 97° C. and an acid value of 14. The solution derived from equal parts of polyester and styrene is clear, and when copolymerized the process of Example 1, gives a product with the following properties:

Flexural strength—19,300 p.s.i.
Flexural modulus—$0.49 \times 10^6$
Barcol hardness—36–39
Heat deflection temperature—127° C.

EXAMPLE 7

The reactants and process are identical to those shown in Example 4, except that 1,2-epoxy octane is used in place of phenyl glycidyl ether. The polyester has a softening point of 91° C. and an acid value of 12.5. Again, the solution derived from equal parts of product and styrene is clear, and on copolymerization by the method of Example 1, gives a product with the following properties:

Flexural strength—17,000 p.s.i.
Flexural modulus—$0.49 \times 10^6$
Barcol hardness—36–40
Heat deflection temperature—121° C.

EXAMPLE 8

The reactants and process are identical to those shown in Example 4, except that 1.25 weight percent vinyl cyclohexene dioxide is used in place of the 2.5 percent phenyl glycidyl ether, and is added at an acid value of about 20. The product has a softening point of 101° C. and an acid value of 12. The solution made up from equal parts of polyester and styrene is clear.

EXAMPLE 9

A one-liter glass round-bottom flask is fitted with mechanical stirrer, carbon dioxide inlet tube, temperature indicator, and distillation head. The flask is charged with 1 mole of polyoxybutylene(4)hydrogenated 2,2-di(4-hydroxyphenyl) methane (prepared by reacting 4 moles of butylene oxide with 1 mole of hydrogenated 2,2-di(4-hydroxyphenyl) methane in the presence of sodium hydroxide catalyst), 1 mole of maleic acid, and 0.25 gram of hydroquinone. Carbon dioxide is bubbled into the mixture of reactants and the mixture heated to 150° C. These conditions are maintained until 70 weight percent of the maleic acid has reacted. The external heating is stopped and 31 grams (5 weight percent of polyester composition) of styrene oxide are added. The reaction mixture is then heated at 150° C. for 4 hours. Vacuum (about 15 mm. Hg) is then applied for 30 minutes while maintaining the temperature at 150° C. The resulting polyester product is dissolved in equal parts by weight of styrene to give a stable, clear solution.

EXAMPLE 10

Four moles of polyoxyethylene(2) 2,2-di(3-chloro-4-hydroxyphenyl) propane and four moles of maleic anhydride are added to a three-liter flask provided with mechanical stirrer, carbon dioxide inlet tube, temperature indicator, and distillation head. Carbon dioxide is bubbled into the mixture, and stirring rate is set at 130 r.p.m., and the mixture is heated to 225° C. These conditions are maintained for seven hours. External heating is stopped, and three weight percent, based on the weight of polyester, of epichlorohydrin added over a five minute period, at a stirring rate of 250 r.p.m. When all the epichlorohydrin has been added, the stirring rate is reset at 125 r.p.m. and the heat is reapplied to maintain a reaction temperature of 225° C. These conditions are maintained for ½ hour, then vacuum (about 15 mm. of Hg) is applied. The process is continued for one or more hours, and then the product is poured into an aluminum tray and cooled. Equal parts of the cooled polyester product and styrene are blended to give a perfectly clear solution.

EXAMPLE 11

Four moles of polyoxyethylene(2) 2,2-di-(3-chloro-4-hydroxyphenyl) propane, and four moles of maleic anhydride are added to a three-liter flask provided with mechanical stirrer, carbon dioxide inlet tube, temperature indicator, and distillation heat vented to an exhaust hood. The mass is warmed until fluid, carbon dioxide gas is bubbled into the mixture, stirring rate is set at 130 r.p.m., and the mixture is heated to 225° C. These conditions are maintained for five to six hours. External heating is stopped and ethylene oxide is bubbled into the reaction mass until it is determined by weighing the flask that three weight percent, based on the polyester weight, of ethylene oxide has been added. Stirring rate is set at 125 r.p.m. and heat reapplied to maintain reaction temperature of 225° C. These conditions are maintained for ½ hour, then vacuum (about 15 mm. of Hg) is applied.

The process is continued for one or more hours, and then the product is poured into an aluminum tray and cooled. Equal parts of the cooled polyester product and chloro styrene are blended to give a perfectly clear solution.

EXAMPLE 12

A three-liter glass round-bottom flask is fitted with mechanical stirrer, carbon dioxide inlet tube, temperature indicator and distillation head. The flask is charged with 4 moles of polyoxypropylene (16) 2,2-di(4-hydroxyphenyl) propane. While the glycol is warmed and stirred, 4 moles of fumaric acid are added along with 0.05 weight percent of hydroquinone. When addition of these ingredients is completed, carbon dioxide is bubbled into the mass, stirring rate is set at 130 r.p.m., and the reactants are heated to 210° C. These conditions are maintained for six hours. External heating is stopped, and 5 weight percent of vinyl cyclohexene dioxide are added over a ten minute period, at stirring rate of 260 r.p.m. When all the dioxide has been added, the stirring rate is reset at 130 r.p.m. and heat is reapplied to maintain a reaction temperature of 210° C. These conditions are maintained for thirty minutes and then vacuum (about 15 mm. of Hg) is applied. The process is continued for one more hour, and then the product is poured into an aluminum tray and cooled. The cooled product is dissolved in equal parts by weight of styrene to give a stable, clear solution.

Although this invention has been described with reference to particular embodiments and examples, it will be apparent to those skilled in the art that variations and modifications thereof can be made without departing from the principles and true spirit of the invention.

Having described the invention, what is desired to be secured by Letters Patent is:

1. A mixture of an ethylenically unsaturated monomer and a polyester composition, soluble without turbidity or haze in said ethylenically unsaturated monomer, said polyester composition consisting essentially of the reaction product of an epoxide compound, selected from the group consisting of mono- and di-epoxides having a molecular weight of 44 to 1000, and an esterification product of essentially equimolar amounts of an ethylenically unsaturated dicarboxylic acid and a polyoxyalkylene ether of a dihydric phenol, wherein the weight ratio of said epoxide to said esterification product is from 0.01 to 0.10 and the concentration of said ethylenically unsaturated monomer in said mixture is from about 5 to about 95 weight percent.

2. The composition of claim 1 wherein said polyester and said ethylenically unsaturated monomer have been copolymerized.

3. The composition of claim 1 wherein the ethylenically unsaturated dicarboxylic acid is selected from the group consisting of maleic acid and fumaric acid, and the polyoxyalkylene ether of dihydric phenol has the formula:

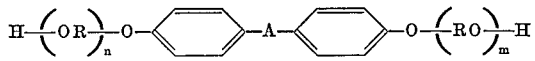

wherein $n$ and $m$ are integers and the sum of $n$ and $m$ is from 2 to 20, A is an alkylene group having from 1 to 4 carbon atoms, and R is an alkylene group having from 2 to 4 carbon atoms.

4. The composition of claim 3 wherein the epoxy compound is selected from the group consisting of phenyl glycidyl ether, vinyl cyclohexene dioxide, di-glycidyl ether of 2,2-di-(4-hydroxy-phenyl) propane, 1,2-epoxy eicosane, cyclooctane epoxide, and 1,2-epoxy octane.

5. The composition according to claim 1 wherein the weight ratio of said epoxide compound to said polyester reaction product is from .01 to .05.

6. The composition according to claim 4 wherein the weight ratio of said epoxide compound to said polyester reaction product is from .01 to .05.

7. The composition of claim 5 wherein said polyester and said ethylenically unsaturated monomer have been copolymerized.

8. A composition according to claim 6 wherein said polyester and said ethylenically unsaturated monomer have been copolymerized.

9. A process for improving the solubility of a carboxy salt containing polyester composition in an ethylenically unsaturated monomer, said polyester composition being an essentially equimolar reaction product of an ethylenically unsaturated dicarboxylic acid and a polyoxyalkylene ether of a dihydric phenol, which comprises reacting said polyester composition at a temperature from about 125 to about 250° C. with an epoxide compound of molecular weight from about 44 to 1000 for from one-half hour to ten hours, and dissolving the reaction product in an ethylenically unsaturated monomer wherein the weight ratio of said epoxide to said polyester is from .01 to 0.1, and the ethylenically unsaturated monomer concentration is from about 5 to about 95 weight percent.

10. A process according to claim 9 wherein the concentration of said polyester composition in solution is from 5 to 95 weight percent of the solution.

11. A process according to claim 9 wherein the epoxide selected from the group consisting of phenyl glycidyl ether, vinyl cyclohexene dioxide, diglycidyl ether of 2,2-di-(4-hydroxyphenyl) propane, 1,2-epoxy eicosane, cyclooctane epoxide, and 1,2-epoxy octane.

12. The process of claim 9 wherein said ethylenically unsaturated dicarboxylic acid is selected from the group consisting of maleic acid and fumaric acid and the polyoxyalkylene ether of a dihydric phenol has the formula:

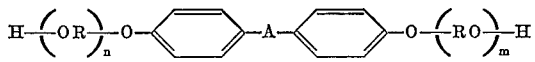

wherein $n$ and $m$ are integers and the sum of $n$ and $m$ is from 2 to 20, A is an alkylene group having from 1 to 4 carbon atoms, and R is an alkylene group having from 1 to 4 carbon atoms.

13. A process according to claim 12 wherein the epoxide compound and said polyester composition are in a weight ratio of from .01 to .05.

14. A process according to claim 9 wherein the weight ratio of the epoxy compound to the polyester composition is from .01 to .05.

References Cited

UNITED STATES PATENTS

| 2,331,265 | 10/1943 | Coleman | 260—47 |
| 2,634,251 | 4/1953 | Kass | 260—47 |
| 3,214,491 | 10/1965 | Stamton | 260—871 |
| 3,297,782 | 1/1967 | Barkis | 260—835 |

PAUL LIEBERMAN, Primary Examiner

U.S. Cl. X.R.

260—47, 861, 2, 837, 836